Dec. 17, 1968    F. W. RECKNAGEL    3,416,848
COMBINATION BALL AND NEEDLE BEARING WITH
MINIMUM ROLLING FRICTION
Filed Aug. 10, 1966    2 Sheets-Sheet 1

INVENTOR.
FREDERICK W. RECKNAGEL
BY
ATTORNEY.

Dec. 17, 1968  F. W. RECKNAGEL  3,416,848
COMBINATION BALL AND NEEDLE BEARING WITH
MINIMUM ROLLING FRICTION
Filed Aug. 10, 1966  2 Sheets-Sheet 2

INVENTOR.
FREDERICK W. RECKNAGEL
BY
ATTORNEY.

United States Patent Office 3,416,848
Patented Dec. 17, 1968

3,416,848
COMBINATION BALL AND NEEDLE BEARING WITH MINIMUM ROLLING FRICTION
Frederick W. Recknagel, Verbank, N.Y., assignor to Federal Bearing Co., Inc., Poughkeepsie, N.Y., a corporation of New York
Continuation-in-part of application Ser. No. 375,058, June 16, 1964. This application Aug. 10, 1966, Ser. No. 571,585
9 Claims. (Cl. 308—174)

ABSTRACT OF THE DISCLOSURE

A combination ball and needle bearing is provided comprising an outer annular race member and an inner cylindrical race member passing concentrically through it, the combination of members defining a first and a second bearing compartment. The first bearing compartment has a cylindrical inner surface in the outer member which defines an annular chamber with the outer surface of the inner member, the annular chamber having confined therein less than a full complement of needle rollers spaced from each other by a cage. An annular stop means is employed intermediate the first and second compartments for confining the needle rollers in the first compartment and for inhibiting axial movement of the needle rollers to the second compartment. A raceway groove is disposed in the inner surface of the outer member and one in the outer surface of the inner member of the second compartment confining less than a full complement of balls therein spaced from each other by a cage. An annular shield is employed at the end of the first compartment to inhibit movement of the caged needle bearing out of the compartment, with bearing seal means closing the ends of the bearing.

---

This invention is a continuation-in-part of my copending application Ser. No. 375058, filed June 16, 1964 and relates to antifriction bearings and, in particular, to a combination ball and needle bearing designed to take relatively high radial loads as well as substantial thrust loads.

In automotive and other engineering applications, certain bearings are required that will take relatively high radial as well as high thrust or axial loads. Bearings have been proposed having this two-fold feature. An example of one proposed bearing of the foregoing general class comprised inner and outer bearing rings having cylindrical raceway surfaces with rollers confined therebetween, the rings having complementary ball raceway grooves with balls confined therein. A full complement of needle rollers was employed, the balls being confined at one end, the diameter of which being determined as a whole number multiple of the diameter of the rollers. Some of the rollers were interposed between adjacent balls to space the latter apart, while others of the rollers were axially aligned with the balls confined in the raceway grooves between the rings.

A disadvantage of the foregoing bearing was that the full complement of bearing elements generally gave rise to rolling friction as between themselves. For example, as a first needle element turned about its own axis relative to an element adjacent it, the adjacent element by virtue of its frictional contact with the first element tended to rotate in the opposite direction about its own axis. Since the full complement of rolling elements rotated relatively to the raceway in contact therewith, the rotational rubbing between adjacent bearing elements within the framework of the bearing ring tended to increase the rolling friction. Likewise, where the balls separated multiple groups of the rolling elements and were in rolling contact therewith, the rolling elements would tend to be grooved by the balls.

In another instance in which a combination bearing was proposed, the raceways for the needle bearing and the raceways for the ball bearing merged directly into each other uninterruptedly with the raceways formed by one of the bearing rings having essentially like diametric dimensions. Thus, the raceways of the ball bearings constitute in a certain sense only an extension of the needle raceways, the extension portion of the bearing being stepped shoulder-like to form the raceways for the ball bearings. However, this design had its limitations in that thrust on the bearing was generally limited in one direction, and that where two-fold thrust was desired, that is thrust in either direction, then two sets of ball bearings had to be used, one on each end of the bearing proper.

I now provide a combination ball and needle bearing which overcomes the disadvantages of prior combination bearings.

It is thus an object of my invention to provide an antifriction bearing having a plurality of bearing compartments wherein at least one compartment contains ball bearings and at least one compartment contains needle or roller bearings.

Another object of my invention is to provide a combination ball and needle bearing capable of taking relatively high radial loads as well as relatively high thrust.

A still further object is to provide a combination ball and needle bearing adapted for both high radial and thrust loads with minimum rolling friction.

The invention also provides an antifriction bearing having a pair of compartments disposed at opposite ends thereof containing needle or roller bearings and a compartment intermediate said ends containing ball bearings.

These and other objects will more clearly appear when taken in conjunction with the following disclosure and the accompanying drawing, wherein.

Figure 1:
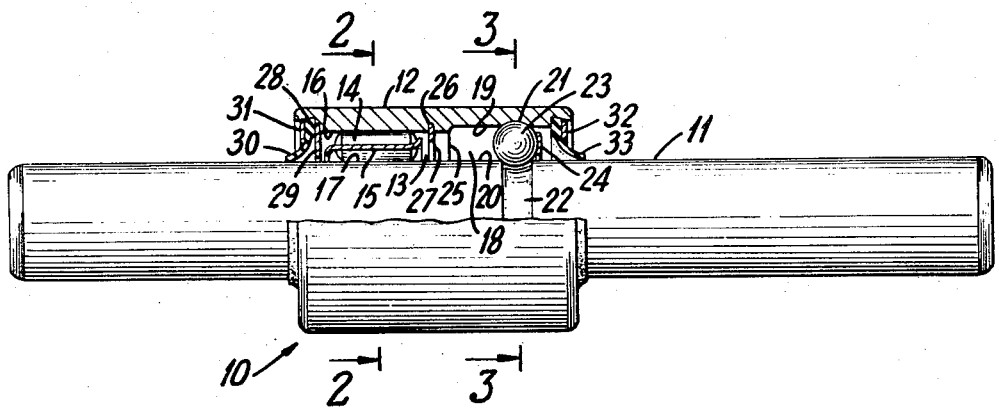
FIG. 1 is a partial section of the combination ball and needle bearing.
Figure 2:
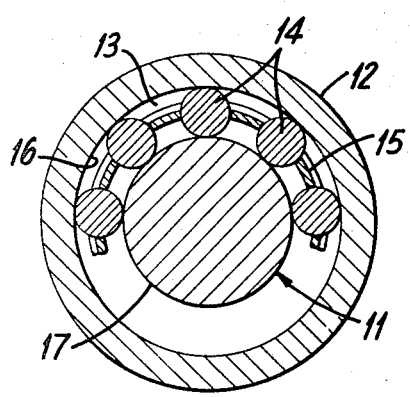
FIG. 2 is an enlarged cross section of the bearing taken along line 2—2 of FIG. 1.
Figure 3:
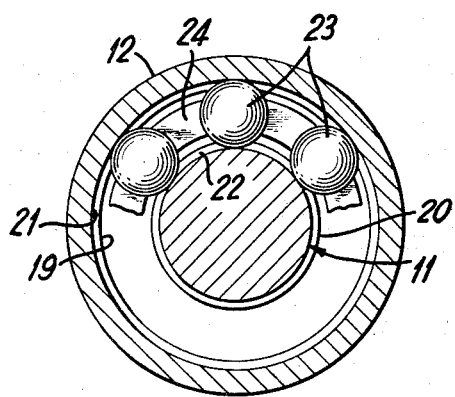
FIG. 3 is an enlarged cross section of the bearing taken along line 3—3 of FIG. 1.

Stating it broadly, the combination ball and needle bearing provided by my invention comprises an outer race member and a cylindrical inner race member, such as a shaft, passing concentrically therethrough. The bearing is divided into a plurality of bearing compartments, for example, a first bearing compartment and a second bearing compartment in which the first compartment has a cylindrical inner race in the outer member which defines an annular chamber with the outer race of the inner cylindrical member. Preferably, the annular chamber of the first compartment has confined in it less than a full complement of needle rollers spaced from each other by a cage. An annular stop means is provided between adjacent bearing compartments for confining the needle rollers in one compartment and for inhibiting axial movement of the needle rollers to an adjacent or second compartment containing ball elements. In the second compartment, a raceway groove is provided in the inner surface of the outer member and a raceway groove in the outer surface of the inner member confining therein less than a full complement of balls spaced from each other by a cage.

The ends of the bearing are closed by bearing seal means well known in the art.

Referring to FIGS. 1 to 4, a bearing 10 of one embodiment of the invention is depicted comprising an inner cylindrical member in the form of a shaft 11 passing concentrically through outer cylindrical race member 12, the bearing having two compartments, a first compartment 13 with needle rollers 14 therein spaced apart from each other by cage 15 and bearing against inner and outer raceways 16 and 17, respectively. The second compartment 18 is comprised of inner and outer surfaces 19 and 20 having ball bearing raceway grooves 21 and 22 containing less than a full complement of balls 23 spaced apart from each other by cage 24.

Figure 4:
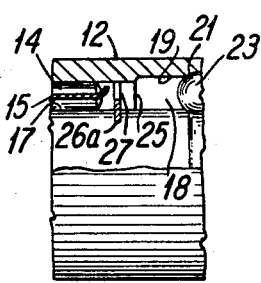
FIG. 4 is a fragment of FIG. 1 showing an annular stop means secured to the inner member.

The diameter of the inner surface of the second or ball bearing compartment is preferably greater than that of the first or needle bearing compartment. This enables using balls having greater diameter than that of the needle rollers which together with adequate groove depth of the raceway assures the necessary support for high thrust loads. The second compartment is shown in FIG. 1 terminating into a shoulder 25 relative to the smaller diameter of the inner race of the first compartment. Adjacent the shoulder and substantially intermediate the first and second compartment, an annular groove 26 is provided in the outer member having an annular stop means in the form of a split washer 27 spring fitted therein for confining the caged needle rollers against axial movement towards the ball bearing compartment. In FIG. 4, the split washer 27 is shown spring fitted in annular groove 26a to achieve the same effect.

At the outer end of the needle bearing compartment an undercut annular shoulder 28 is provided having a shield 29 of metal or other suitable material spring fitted therein, the shield terminating radially inwardly just short of the shaft. The shield is important in that it retains the caged needle bearing within its compartment and prevents it from moving out of the end of the bearing against the seal. An annular bearing seal 30 of elastomeric material, e.g., molded Buna "N" rubber, is force fitted into the annular space defined by the shoulder, the annular radius of the seal being large enough so that the circumferential lip of the seal is held in flexing engagement against the inner bearing member or shaft, the seal being locked in position by means of a split washer 31 as shown. Alternatively, the seal of Buna "N" rubber may be molded onto a cupped or dished metal washer which is inserted against the annular shoulder and flattened out to fix it in position.

The outer end of the second or ball bearing compartment is similarly closed by an elastomeric seal 33 of, for example, Buna "N" rubber, which may be held in place by a split washer 32, although a rubber seal molded to a metal washer may be suitable for the purpose.

As will be apparent from the description and the drawings, the two compartmented bearing behaves as two separate bearings, although, in effect, the bearing as a whole is unitary in structure. As stated above, it is preferred that the diameter of the balls be larger than the diameter of the needle bearings and at the same time be out of contact with the needle bearing and with each other so as to keep rolling friction within the bearing to a minimum.

Figure 5:
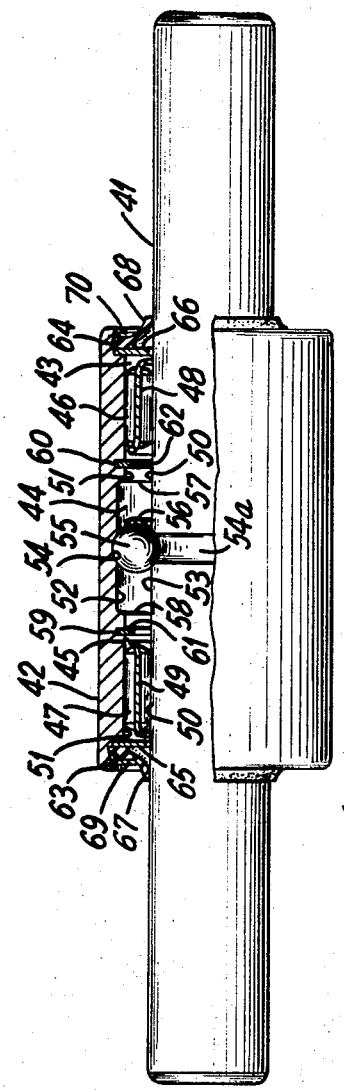
FIG. 5 depicts another embodiment of the invention showing two compartments at opposite ends thereof confining needle bearings therein and another compartment intermediate thereof confining ball bearings therein.

Referring now to FIG. 5, a three compartmented bearing 40 of another embodiment of the invention is depicted comprising an inner cylindrical member in the form of a shaft 41 passing concentrically through outer cylindrical race member 42, the bearing have three compartments, 43, 44 and 45, compartments 43 and 45 being at opposite ends of the bearing and confining therein needle rollers 46 and 47 spaced apart from each other by cages 48 and 49, respectively, and bearing against inner and outer raceways 50 and 51, respectively. Compartment 44 is comprised of inner and outer surfaces 52 and 53 having ball bearing raceway grooves 54 and 54a containing less than a full complement of balls 55 spaced apart from each other by cage 56.

The diameter of the inner surface of the middle or ball bearing compartment is preferably greater than that of the oppositely disposed needle bearing compartments. This enables using balls having greater diameter than that of the needle rollers which together with adequate groove depth of the raceway assures the necessary support for high thrust loads. The middle compartment is shown in FIG. 5 terminating at each side thereof into shoulder 57 and 58 relative to the smaller diameter of the inner race of the first compartment. Adjacent to each of the shoulders and substantially intermediate the middle and end compartments, annular grooves 59 and 60 are provided in the outer member, each having an annular stop means in the form of split washers 61 and 62 spring fitted in their respective grooves for confining the caged needle rollers against axial movement towards the ball bearing compartment. If desirable, the washers may be spring fitted to the shaft as shown in FIG. 4.

At the outer ends of the needle bearing compartments undercut annular shoulders 63 and 64 are provided having shields 65, 66, respectively, of metal or other suitable material spring fitted therein, the shields terminating radially inwardly just short of the shaft. The shields are important in that they help to maintain the caged needle bearings within their respective compartments and prevent them from moving out of the ends of the bearing against the seals. Annular bearings seals 67 and 68 of the elastomeric material, e.g. molded Buna "N" rubber, are force fitted into the annular spaces defined by shoulders 63 and 64, respectively, the annual radius of the seals being large enough so that the circumferential lip of each seal is held is flexing engagement against the inner bearing member or shaft, the seals being locked in position by means of split washers 69 and 70 as shown. Alternatively, the seal of Buna "N" rubber may be molded onto a cupped or dished metal washer which is inserted against the annular shoulder and flattened out to fix it in position.

As will be apparent from the description and the drawings, the three compartmented bearing is similar to the previously described two compartmented bearing and in effect, the bearing as a whole is also unitary in function.

While the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A combination ball and needle bearing comprising an outer annular race member and an inner cylindrical race member passing concentrically there through, said combination of members defining a first and a second bearing compartment, said first bearing compartment having a cylindrical inner surface in the outer member which defines an annular chamber with the outer surface of said inner member, said annular chamber having confined therein less than a full complement of needle rollers spaced from each other by a cage, annular stop means intermediate said first and second compartments for confining said needle rollers in said first compartment and for inhibiting axial movement of said needle rollers to said second compartment, a raceway groove in the inner surface of the outer member and one in the outer surface of the inner member of the second compartment for receiving balls therein, the diameter of the inner surface of said second compartment which extends axially at least the diameter of a ball being larger than the first compartment a less than full complement of balls occupying said raceway grooves spaced from each other by a cage, said balls having a diameter larger than the diameter of the needle rollers, an annular shield at the end of said first compartment to inhibit movement of the caged needle bearing out of the compartment, and bearing seal means closing the ends of the bearing.

2. The bearing of claim 1 wherein the annular stop means intermediate said first and second compartments comprises a washer anchored in an annular groove in the inner surface of the outer member and which extends radially short of the inner member.

3. The bearing of claim 1 wherein the annular stop means intermediate said first and second compartments comprises a washer anchored in an annular groove in the surface of the inner member and which extends radially short of the outer member.

4. A combination ball and needle bearing comprising an outer annular race member and an inner cylindrical race member passing concentrically therethrough, said combination of members defining first, second and third bearing compartments, said first bearing compartment having a cylindrical inner surface in the outer member which defines an annular chamber with the outer surface of said inner member, said annular chamber having confined therein less than a full complement of needle rollers spaced from each other by a cage, annular stop means intermediate said first and second compartments for confining said needle rollers in said first compartment and for inhibiting axial movement of said needle rollers to said second compartment, a raceway groove in the inner surface of the outer member and one in the outer surface of the inner member of the second compartment for receiving balls therein, the diameter of the inner surface of said compartment which extends axially at least the diameter of the ball being larger than the first compartment a less than full complement of balls occupying said raceway grooves spaced from each other by a cage, said balls having a diameter larger than the diameter of the needle roller, said third bearing compartment having a cylindrical inner surface in the outer member which defines an annular chamber with the outer surface of said inner member, said annular chamber having confined therein less than a full complement of needle rollers spaced from each other by a cage, annual stop means intermediate said second and third compartments for confining said needle rollers in said third compartment and for inhibiting axial movement of said needle rollers to said second compartment, an annular shield means at the ends of the first and third compartments to inhibit movement of the caged needle bearings out of their respective compartments, and bearing seal means closing the ends of the bearing.

5. The bearing of claim 4 wherein the annular stop means intermediate the compartments comprises a washer anchored in an annular groove in the inner surface of the outer member and which extends radially short of the inner member.

6. The bearing of claim 4 wherein the annular stop means intermediate the compartments comprises a washer anchored in an annular groove in the surface of the inner member and which extends radially short of the outer member.

7. A combination ball and needle bearing comprising an outer annular race member and an inner cylindrical race member passing concentrically therethrough, said combination of members defining at least one needle bearing compartment adjacent to at least one ball bearing compartment, said needle bearing compartment having a cylindrical inner surface in the outer member which defines an annular chamber with the outer surface of said inner member, said annular chamber having confined therein less than a full complement of needle rollers spaced from each other by a cage, annular stop means intermediate said at least one needle bearing compartment and said at least one ball bearing compartment for confining said needle rollers in its compartment and for inhibiting axial movement of said needle rollers to said ball bearing compartment, a raceway groove in the inner surface of the outer member and one in the outer surface of the inner member of the ball bearing compartment for receiving balls therein, the diameter of the inner surface of said ball bearing compartment which extends axially at least the diameter of a ball being larger than the needle bearing compartment a less than full complement of balls occupying said raceway grooves spaced from each other by a cage, said balls having a diameter larger than the diameter of the needle roller, means at the end of the needle bearing compartment to inhibit movement of the caged needle bearing out of its compartment, and bearing seal means closing the ends of the bearing.

8. The bearing of claim 7 wherein the annular stop means intermediate the adjacent compartments comprises a washer anchored in an annular groove in the inner surface of the outer member and which extends radially short of the inner member.

9. The bearing of claim 7 wherein the annular stop means intermediate the adjacent compartments comprises a washer anchored in an annular groove in the surface of the inner member and which extends radially short of the outer member.

References Cited

UNITED STATES PATENTS

| 2,040,489 | 5/1936 | Large | 308—174 |
| 2,094,251 | 9/1937 | Young | 308—174 |
| 2,991,133 | 7/1961 | Gregg | 308—187.2 |
| 1,304,231 | 5/1919 | Wilson | 308—187.1 |

MARTIN P. SCHWADRON, *Primary Examiner.*

FRANK SUSKO, *Assistant Examiner.*